US012615476B2

(12) United States Patent
Huang et al.

(10) Patent No.: US 12,615,476 B2
(45) Date of Patent: Apr. 28, 2026

(54) SOUND BOX

(71) Applicant: Lanto Electronic Limited, Kunshan City (CN)

(72) Inventors: Yufeng Huang, Kunshan City (CN); Chang Sing Chu, Kunshan City (CN); Chung Hung Li, Kunshan City (CN); Cheng Yo Siao, Kunshan City (CN); Chia Wei Chou, Kunshan City (CN); Sheng-Wen Wu, Kunshan City (CN); Shih-Yen Lu, Kunshan City (CN)

(73) Assignee: LANTO ELECTRONIC LIMITED, Kunshan City (CN)

( * ) Notice: Subject to any disclaimer, the term of this patent is extended or adjusted under 35 U.S.C. 154(b) by 181 days.

(21) Appl. No.: 18/762,230

(22) Filed: Jul. 2, 2024

(65) Prior Publication Data

US 2025/0330743 A1 Oct. 23, 2025

(30) Foreign Application Priority Data

Apr. 22, 2024 (CN) ......................... 202410483056.0

(51) Int. Cl.
*H04R 1/28* (2006.01)
*H04R 1/02* (2006.01)

(52) U.S. Cl.
CPC ........... *H04R 1/2811* (2013.01); *H04R 1/025* (2013.01)

(58) Field of Classification Search
CPC .............. H04R 1/2888; H04R 2201/02; H04R 2201/025; H04R 2201/029; B65D 21/086
See application file for complete search history.

(56) References Cited

U.S. PATENT DOCUMENTS 5,664,020 A * 9/1997 Goldfarb .................. H04R 5/02 381/345
2003/0063766 A1* 4/2003 Goldslager .............. H04R 1/02 381/345

(Continued)

FOREIGN PATENT DOCUMENTS

CN 201504301 U * 6/2010
CN 201789604 U * 1/2011

(Continued)

OTHER PUBLICATIONS

Taiwanese Office Action and Search Report for Taiwanese Application No. 113122180, dated Aug. 13, 2025, with English translation.

*Primary Examiner* — Ryan Robinson
(74) *Attorney, Agent, or Firm* — Birch, Stewart, Kolasch & Birch, LLP

(57) ABSTRACT

Provided is a sound box, relating to the technical field of sound box structures. The sound box includes a housing, a slider, and a rotary member. The housing includes a first housing and a second housing that are slidably connected. An inner cavity is formed between the first housing and the second housing. The slider is fixed to the first housing and provided with a first abutting portion and a first hook portion. The rotary member is mounted on the second housing and is rotatable about an axis of the rotary member. The rotary member is provided with a second abutting portion and a second hook portion. When the slider and the rotary member move toward each other, the first abutting portion is capable of abutting against and pushing the second abutting portion to drive the rotary member to rotate.

10 Claims, 6 Drawing Sheets

(56) References Cited

U.S. PATENT DOCUMENTS

| | | | | |
|---|---|---|---|---|
| 2005/0047850 | A1 | 3/2005 | Wright et al. | |
| 2017/0374451 | A1* | 12/2017 | Cheng | H04R 1/2842 |
| 2023/0064050 | A1* | 3/2023 | Lin | G06T 7/70 |

FOREIGN PATENT DOCUMENTS

| | | | | | |
|---|---|---|---|---|---|
| CN | 205921740 | U | | 2/2017 | |
| CN | 109874080 | A | * | 6/2019 | |
| CN | 209170627 | U | * | 7/2019 | |
| CN | 210381230 | U | | 4/2020 | |
| CN | 211509223 | U | * | 9/2020 | |
| CN | 111866631 | A | * | 10/2020 | H04R 1/02 |
| CN | 215581599 | U | | 1/2022 | |
| CN | 117485258 | A | * | 2/2024 | B60R 11/0217 |
| JP | 56000795 | A | * | 1/1981 | |
| WO | WO-2013056481 | A1 | * | 4/2013 | H04R 1/2803 |

* cited by examiner

SOUND BOX

CROSS-REFERENCE TO RELATED APPLICATION

This application claims priority to Chinese Patent Application No. 202410483056.0 filed Apr. 22, 2024, the disclosure of which is incorporated herein by reference in its entirety.

TECHNICAL FIELD

The present disclosure relates to the technical field of sound box structures and, in particular, to a sound box.

BACKGROUND

When the volume of a sound box is too small, the bass effect is poor. However, when the volume of the sound box is too large, the sound box is inconvenient to move and carry. To take into account the issues of sound quality and portability, a sound box with a telescopic volume structure is designed in the related art. The housing of the sound box is formed by the first housing and the second housing. The first housing and the second housing are slidably connected. A telescopic structure is provided in the first housing and the second housing. The telescopic structure adjusts the distance between the first housing and the second housing to adjust the volume of the housing of the sound box. The telescopic structure includes a hook block, a guide block, and a limiting block. The hook block is fixed on the first housing. The guide block is fixed on the second housing. The limiting block is movably mounted on the guide block. The hook block is provided with a hook portion. The guide block is provided with a guide portion. The limiting block is provided with a limiting portion. When the first housing and the second housing are pressed toward each other, the limiting portion is guided by the guide portion to rotate to different orientations. In different orientations, the limiting block can be hooked at different positions of the hook portion so that the position of the hook block can be adjusted along the axial direction of the guide block, and finally, the distance between the first housing and the second housing can be adjusted, thereby changing the volume of the housing of the sound box.

In the telescopic structure of the preceding sound box, the hook block and the guide block act separately on the limiting block, increasing the difficulty of the transmission and cooperation, increasing the manufacturing cost, and increasing the assembly difficulty. In addition, during use, the limiting block not only needs to rotate about the axis of the guide block but also needs to float along the axis of the guide block, causing the limiting block to easily wear out and fail and reducing the service life of the limiting block.

SUMMARY

An object of the present disclosure is to provide a sound box so that the volume of the housing of the sound box can be safely and conveniently adjusted.

To achieve this object, the present disclosure adopts the technical solutions below.

A sound box includes a housing, a slider, and a rotary member.

The housing includes a first housing and a second housing that are slidably connected, where an inner cavity is formed between the first housing and the second housing.

The slider is fixed to the first housing and provided with a first abutting portion and a first hook portion.

The rotary member is mounted on the second housing and is rotatable about an axis of the rotary member, where the rotary member is provided with a second abutting portion and a second hook portion; when the slider and the rotary member move toward each other, the first abutting portion is capable of abutting against and pushing the second abutting portion to drive the rotary member to rotate; when the slider and the rotary member move in opposite directions, the first hook portion is hooked to the second hook portion; and when the second hook portion is hooked to the first hook portion in different orientations, the distances between the slider and the rotary member are different.

In an embodiment, the first abutting portion and the first hook portion are both convex heads, a boss is disposed on a sidewall of the rotary member, an end surface at an end of the boss facing the first housing is the second abutting portion, and an end surface at an end of the boss facing away from the first housing is the second hook portion.

In an embodiment, the volume of the inner cavity is adjustable between multiple set volumes.

In an embodiment, the volume of the inner cavity is adjustable between a first set volume and a second set volume, where the first set volume is less than the second set volume.

The second abutting portion is provided with a first deflection surface, a first stopping surface, a second deflection surface, and a second stopping surface, where the first deflection surface is connected to the first stopping surface, the second deflection surface is connected to the second stopping surface, and the first abutting portion is capable of abutting against the first deflection surface or the second deflection surface to drive the rotary member to rotate.

The second abutting portion is provided with a first guide surface, a first limiting surface, a second guide surface, and a second limiting surface that are connected in sequence, where the first hook portion is capable of abutting against the first guide surface or the second guide surface to drive the rotary member to rotate.

When the first hook portion is guided and stopped by the first guide surface such that the first hook portion abuts against the first limiting surface, the volume of the inner cavity is the first set volume, and the projection of the first abutting portion in the axial direction of the rotary member is located on the first deflection surface.

When the first abutting portion is guided and stopped by the first deflection surface such that the first abutting portion abuts against the first stopping surface, the projection of the first hook portion in the axial direction of the rotary member is located on the second guide surface.

When the first hook portion is guided and stopped by the second guide surface such that the first hook portion abuts against the second limiting surface, the volume of the inner cavity is the second set volume, and the projection of the first abutting portion in the axial direction of the rotary member is located on the second deflection surface.

When the first abutting portion is guided and stopped by the second deflection surface such that the first abutting portion abuts against the second stopping surface, the projection of the first hook portion in the axial direction of the rotary member is located on the first guide surface.

In an embodiment, a speaker located in the inner cavity and fixedly connected to the first housing is further included, where the slider is disposed around the outer circumference of the speaker.

In an embodiment, an annular limiting step is disposed on a side of the first housing facing the second housing, the annular limiting step is provided with a communication hole, the inner cavity communicates with the outside through the communication hole, the speaker covers the communication hole, and the slider is fixedly mounted to the annular limiting step.

In an embodiment, a fixed support located in the inner cavity and fixedly connected to the second housing is further included, where the rotary member is rotatably mounted to the fixed support.

In an embodiment, an annular support groove is disposed around the outer circumference of the fixed support, and the rotary member is mounted in the annular support groove.

In an embodiment, an elastic support member configured to drive the second hook portion to be hooked to the first hook portion is further included.

In an embodiment, the elastic support member is disposed around the outer circumference of the slider and the outer circumference of the rotary member.

The present disclosure has the beneficial effects below.

The slider and the rotary member cooperate with each other. When the slider slides toward the rotary member, the first abutting portion and the second abutting portion cooperate with each other to drive the rotary member to rotate; and when the slider slides away from the rotary member, the first hook portion and the second hook portion are hooked to limit the first housing and the second housing, thereby adjusting the volume of the inner cavity between the first housing and the second housing. During the adjustment process, the slider only performs a slide translation, and the rotary member only rotates about the axis of the rotary member. The transmission and cooperation between the slider and the rotary member are simple, the manufacturing cost is low, and the assembly is easy, thereby reducing wear during use and extending the service life.

REFERENCE LIST

Figure 1:
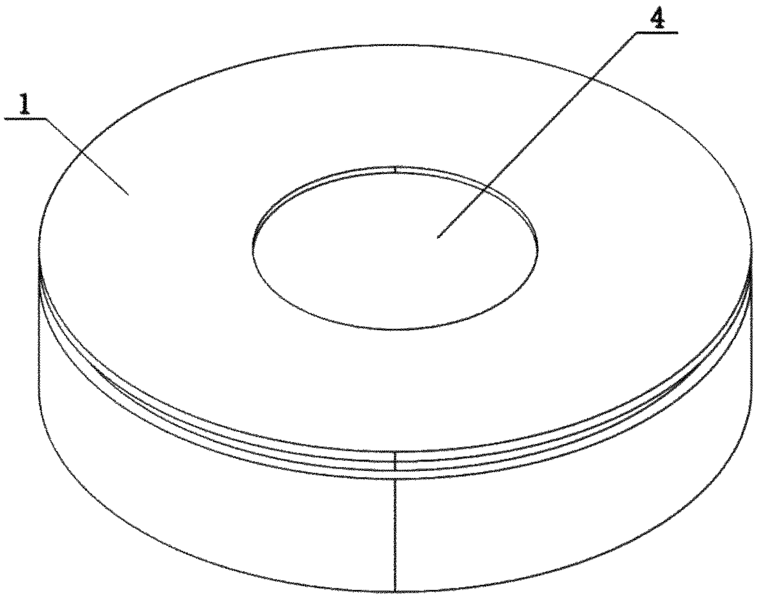
FIG. 1 is a structural view of a sound box according to an embodiment of the present disclosure.
Figure 2:
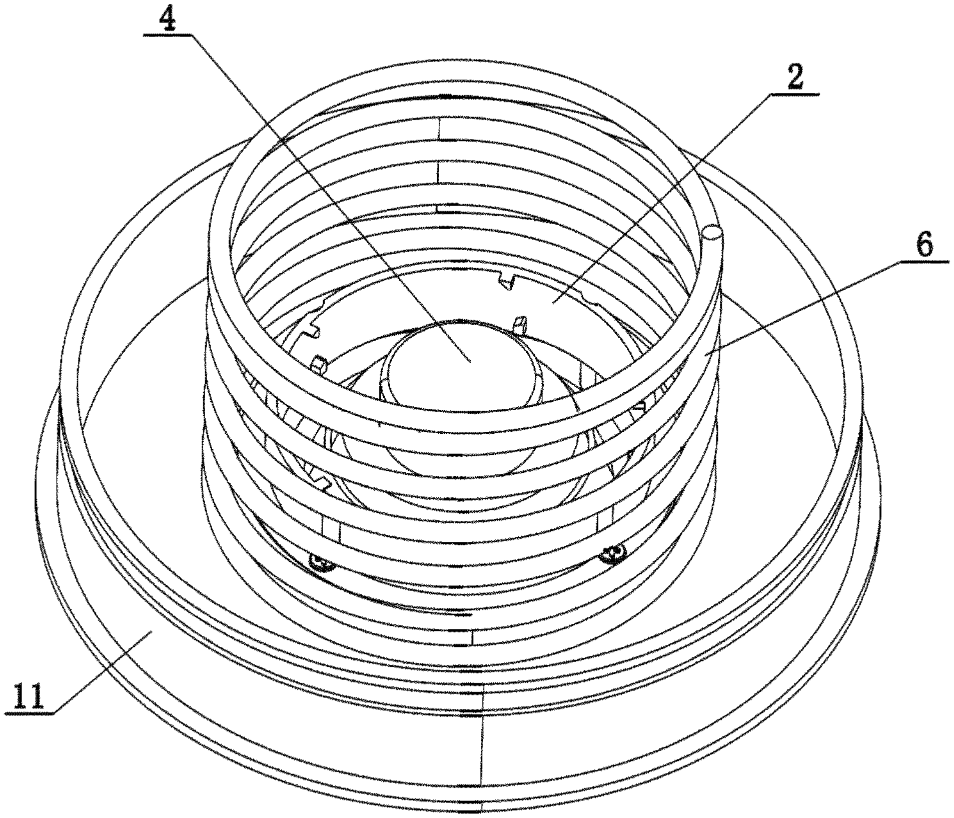
FIG. 2 is a structural view illustrating that a first housing, a slider, a speaker, and an elastic support member cooperate with each other according to an embodiment of the present disclosure.
Figure 3:
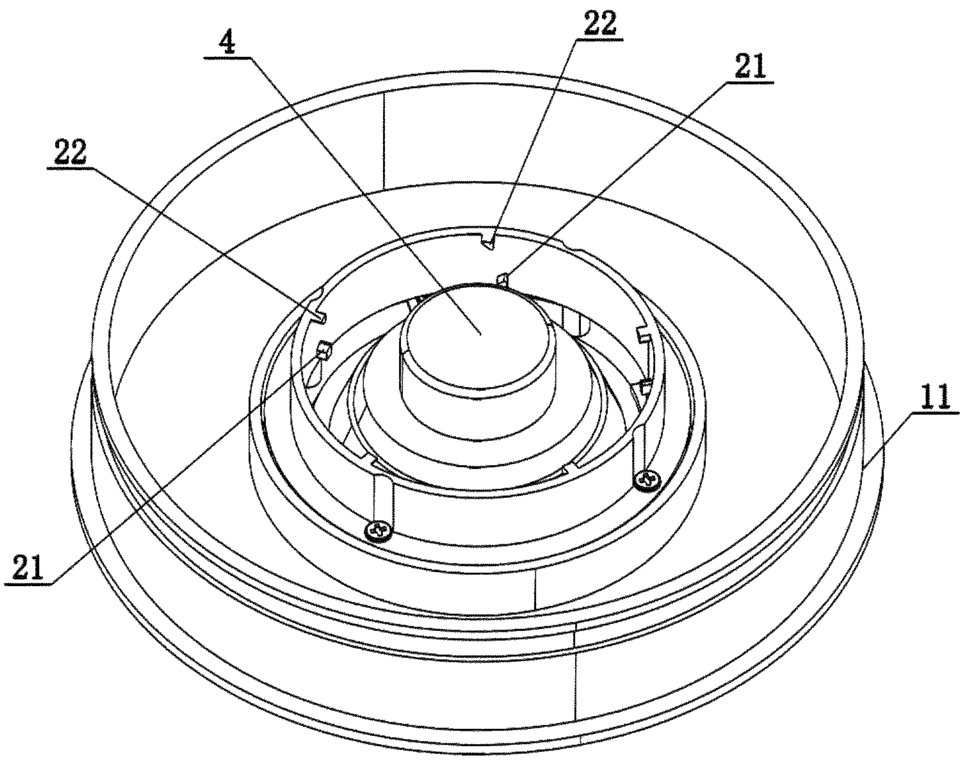
FIG. 3 is a structural view illustrating that a first housing, a slider, and a speaker cooperate with each other according to an embodiment of the present disclosure.
Figure 4:
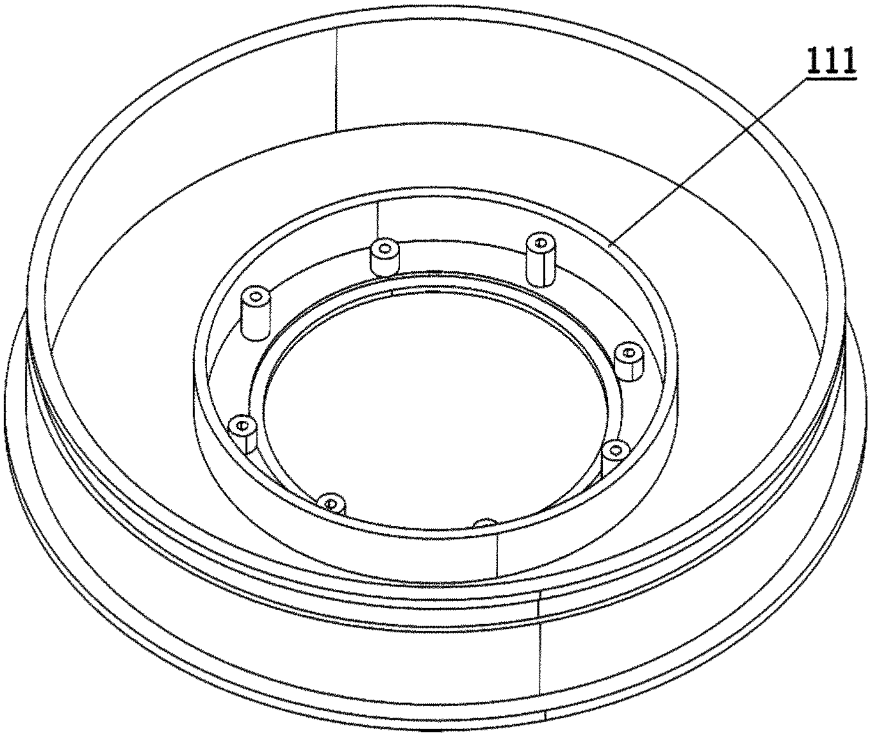
FIG. 4 is a structural view of a first housing according to an embodiment of the present disclosure.
Figure 5:
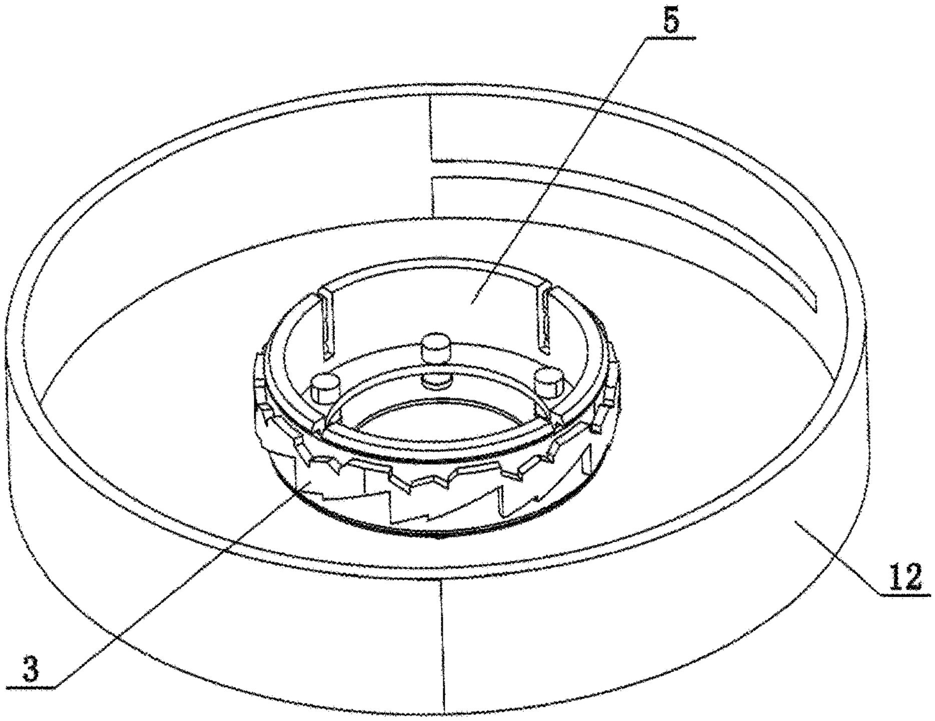
FIG. 5 is a structural view illustrating that a second housing, a rotary member, and a fixed support cooperate with each other according to an embodiment of the present disclosure.
Figure 6:
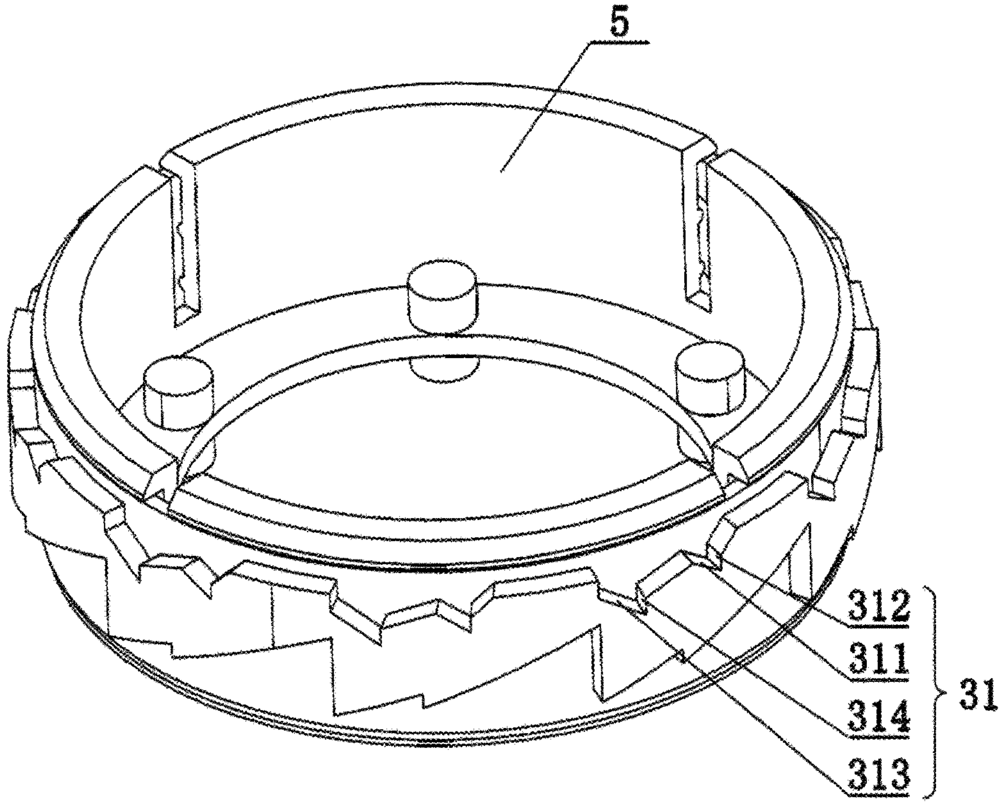
FIG. 6 is a structural view of an orientation in which a rotary member and a fixed support cooperate with each other according to an embodiment of the present disclosure.
Figure 7:
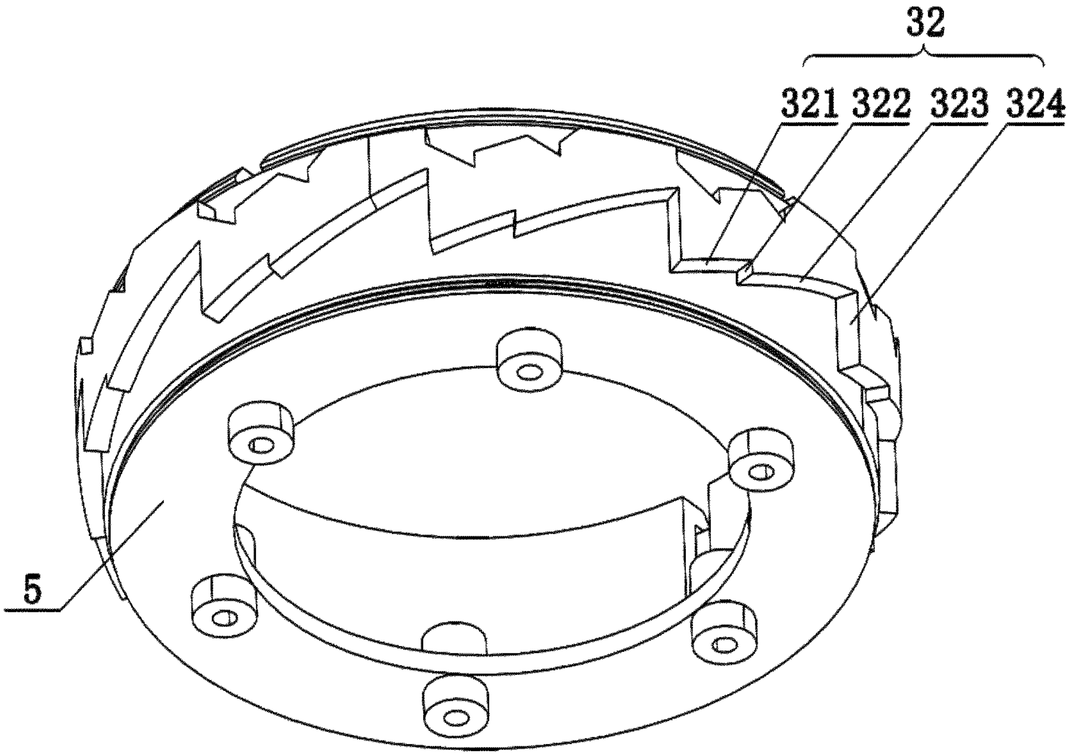
FIG. 7 is a structural view of another orientation in which a rotary member and a fixed support cooperate with each other according to an embodiment of the present disclosure.
Figure 8:
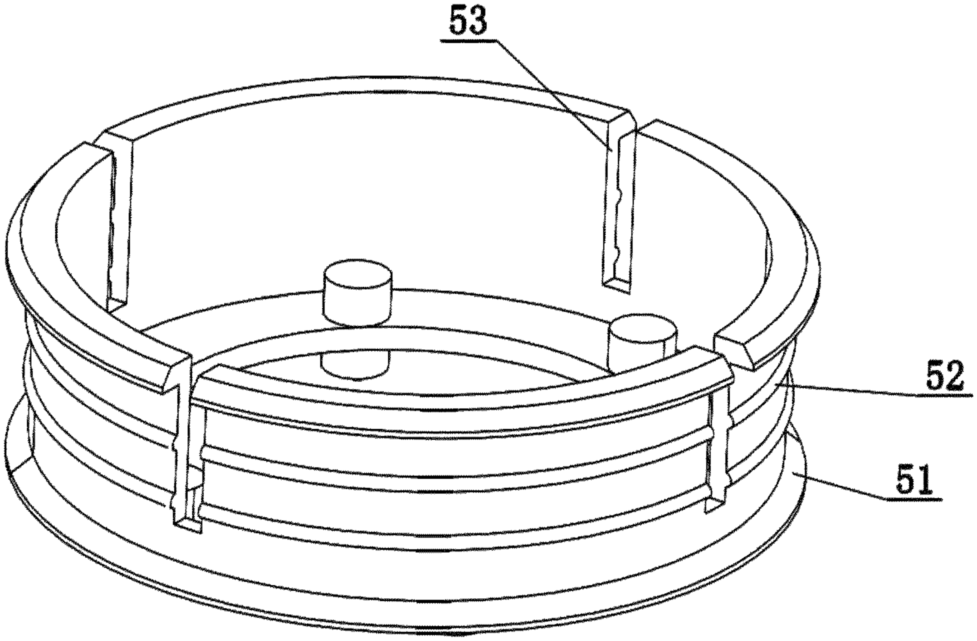
FIG. 8 is a structural view of a fixed support according to an embodiment of the present disclosure.

1 housing
11 first housing
111 annular limiting step
12 second housing
2 slider
21 first abutting portion
22 first hook portion
3 rotary member
31 second abutting portion
311 first deflection surface
312 first stopping surface
313 second deflection surface
314 second stopping surface
32 second hook portion
321 first guide surface
322 first limiting surface
323 second guide surface
324 second limiting surface
4 speaker
5 fixed support
51 annular support groove
52 annular ridge
53 notch
6 elastic support member

DETAILED DESCRIPTION

Embodiments of the present disclosure are described in detail below. Examples of the embodiments are illustrated in the drawings, where the same or similar reference numerals indicate the same or similar components or components having the same or similar functions. The embodiments described hereinafter with reference to the drawings are merely exemplary. The embodiments are intended to explain the present disclosure and are not to be construed as limiting the present disclosure.

In the description of the present disclosure, unless otherwise expressly specified and limited, the term "connected to each other", "connected", or "fixed" is to be construed in a broad sense, for example, as fixedly connected or detachably connected; mechanically connected or electrically connected; directly connected to each other or indirectly connected to each other via an intermediary; or internally connected or interactional between two elements. For those of ordinary skill in the art, specific meanings of the preceding terms in the present disclosure may be understood based on specific situations.

In the description of the present disclosure, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

The technical solutions of the present disclosure are further described hereinafter in conjunction with the drawings and the embodiments.

As shown in FIGS. 1 to 14, the present disclosure provides a sound box including a housing 1, a slider 2, and a rotary member 3. The housing 1 includes a first housing 11 and a second housing 12 that are slidably connected. An inner cavity is formed between the first housing 11 and the second housing 12. The slider 2 is fixed to the first housing 11 and provided with a first abutting portion 21 and a first hook portion 22. The rotary member 3 is mounted on the second housing 12 and is rotatable about the axis of the rotary member 3. The rotary member 3 is provided with a second abutting portion 31 and a second hook portion 32. When the slider 2 and the rotary member 3 move toward each other, the first abutting portion 21 is capable of abutting against and pushing the second abutting portion 31 to drive the rotary member 3 to rotate. When the slider 2 and the rotary member 3 move in opposite directions, the first hook portion 22 is hooked to the second hook portion 32. When the second hook portion 32 is hooked to the first hook portion 22 in different orientations, the distances between the slider 2 and the rotary member 3 are different, so as to adjust the volume of the inner cavity between the first housing 11 and the second housing 12.

In the present disclosure, the slider 2 and the rotary member 3 cooperate with each other. When the slider 2 slides toward the rotary member 3, the first abutting portion 21 and the second abutting portion 31 cooperate with each other to drive the rotary member 3 to rotate; and when the slider 2 slides away from the rotary member 3, the first hook portion 22 and the second hook portion 32 are hooked to limit the first housing 11 and the second housing 12, thereby adjusting the volume of the inner cavity between the first housing 11 and the second housing 12. During the adjustment process, the slider 2 only performs a slide translation, and the rotary member 3 only rotates about the axis of the rotary member 3. The transmission and cooperation between the slider 2 and the rotary member 3 are simple, the manufacturing cost is low, and the assembly is easy, thereby reducing wear during use and extending the service life.

In this embodiment, the first housing 11 and the second housing 12 are slidably connected along the first direction. The housing 1 further includes a sealing ring. The second housing 12 is sleeved on the outer side of the first housing 11, and the sealing ring is sleeved on the outer side of the first housing 11 and sandwiched between the first housing 11 and the second housing 12.

In an embodiment, the first abutting portion 21 and the first hook portion 22 are both convex heads, a boss is disposed on a sidewall of the rotary member 3, an end surface at an end of the boss facing the first housing 11 is the second abutting portion 31, and an end surface at an end of the boss facing away from the first housing 11 is the second hook portion 32. In this manner, the mating structure between the slider 2 and the rotary member 3 can be further simplified, and the safety and reliability of the transmission between the slider 2 and the rotary member 3 can be improved.

In an embodiment, the volume of the inner cavity is adjustable between multiple set volumes. Multiple hook positions are provided on the second hook portion 32 so that the inner cavity has different volumes when the first hook portion 22 is at different hook positions, thereby increasing the adjustability of the housing 1 of the sound box.

In this embodiment, the volume of the inner cavity is adjustable between a first set volume and a second set volume, where the first set volume is less than the second set volume.

The second abutting portion 31 is provided with a first deflection surface 311, a first stopping surface 312, a second deflection surface 313, and a second stopping surface 314, where the first deflection surface 311 is connected to the first stopping surface 312, the second deflection surface 313 is connected to the second stopping surface 314, and the first abutting portion 21 is capable of abutting against the first deflection surface 311 or the second deflection surface 313 to drive the rotary member 3 to rotate. The second abutting portion 32 is provided with a first guide surface 321, a first limiting surface 322, a second guide surface 323, and a second limiting surface 324 that are connected in sequence, where the first hook portion 22 is capable of abutting against the first guide surface 321 or the second guide surface 323 to drive the rotary member 3 to rotate.

The first deflection surface 311, the first stopping surface 312, the second deflection surface 313, the second stopping surface 314, the first guide surface 321, the first limiting surface 322, the second guide surface 323, and the second limiting surface 324 are all parallel to the radial direction of the rotary member 3; the first deflection surface 311, the second deflection surface 313, the first guide surface 321, and the second guide surface 323 are all arranged at an angle with the first direction; and the first stopping surface 312, the second stopping surface 314, the first limiting surface 322, and the second limiting surface 324 are all parallel to the first direction.

When the first hook portion 22 is guided and stopped by the first guide surface 321 such that the first hook portion 22 abuts against the first limiting surface 322, the volume of the inner cavity is the first set volume, and the projection of the first abutting portion 21 in the axial direction of the rotary member 3 is located on the first deflection surface 311. When the first abutting portion 21 is guided and stopped by the first deflection surface 311 such that the first abutting portion 21 abuts against the first stopping surface 312, the projection of the first hook portion 22 in the axial direction of the rotary member 3 is located on the second guide surface 323. When the first hook portion 22 is guided and stopped by the second guide surface 323 such that the first hook portion 22 abuts against the second limiting surface 324, the volume of the inner cavity is the second set volume, and the projection of the first abutting portion 21 in the axial direction of the rotary member 3 is located on the second deflection surface 313. When the first abutting portion 21 is guided and stopped by the second deflection surface 313 such that the first abutting portion 21 abuts against the second stopping surface 314, the projection of the first hook portion 22 in the axial direction of the rotary member 3 is located on the first guide surface 321.

Moreover, to ensure that the forces between the slider 2 and the rotary member 3 are balanced when the slider 2 drives the rotary member 3 to rotate and when the slider 2 is hooked to the rotary member 3, one first guide surface 321, one first limiting surface 322, one second guide surface 323, and one second limiting surface 324 form a group; the second hook portion 32 is provided with multiple groups of first guide surfaces 321, first limiting surfaces 322, second guide surfaces 323, and second limiting surfaces 324 that are evenly distributed along the circumferential direction of the rotary member 3 and connected end to end; and each group of the first guide surface 321, the first limiting surface 322, the second guide surface 323, and the second limiting surface 324 is provided with one first hook portion 22, each first hook portion 22 corresponds to one first abutting portion 21, and each first abutting portion 21 corresponds to one first deflection surface 311, one first stopping surface 312, one second deflection surface 313, and one second stopping surface 314 on the second abutting portion 31.

In this manner, the volume of the inner cavity can be accurately switched between the first set volume and the second set volume.

In other embodiments, it is also feasible that the second abutting portion 31 and the second hook portion 32 are both convex heads, a boss is disposed on a sidewall of the slider 2, an end surface at an end of the boss facing the second housing 12 is the first abutting portion 21, and an end surface at an end of the boss facing away from the second housing 12 is the first hook portion 22.

In other embodiments, the volume of the inner cavity is configured to be adjusted between three set volumes as needed.

In an embodiment, the sound box further includes a speaker 4 located in the inner cavity and fixedly connected to the first housing 11, where the slider 2 is disposed around the outer circumference of the speaker 4. In this manner, full use of the internal space of the slider 2 can be made, thereby making the internal space of the sound box more compact.

In an embodiment, an annular limiting step 111 is disposed on a side of the first housing 11 facing the second housing 12, the annular limiting step 111 is provided with a communication hole, the inner cavity communicates with the outside through the communication hole, the speaker 4 covers the communication hole, and the slider 2 is fixedly mounted to the annular limiting step 111. In this manner, the slider 2 can be assembled on the first housing 11 more accurately.

In an embodiment, the sound box further includes a fixed support 5 located in the inner cavity and fixedly connected to the second housing 12, where the rotary member 3 is rotatably mounted to the fixed support 5. In this manner, the rotary member 3 can rotate more smoothly and reliably.

In an embodiment, an annular support groove 51 is disposed around the outer circumference of the fixed support 5, and the rotary member 3 is mounted in the annular support groove 51. The rotary member 3 is limited by the annular support groove 51 so that the rotary member 3 can rotate more smoothly.

In this embodiment, the fixed support 5 and the rotary member 3 are both annular, the speaker 4 can extend into the fixed support 5, annular ridges 52 are disposed at the bottom of the annular support groove 51, and the inner wall of the rotary member 3 abuts against the annular ridges 52. The annular ridges 52 are provided so that the contact area between the rotary member 3 and the fixed support 5 can be reduced, thereby further making the rotation of the rotary member 3 smoother. Moreover, the fixed support 5 is provided with notches 53 penetrating the inner and outer walls of the fixed support 5, and the notch 53 extends to an end of the fixed support 5 facing away from the second housing 12. The notches 53 are provided so that the rotary member 3 can be sleeved on the fixed support 5 conveniently.

In other embodiments, the fixed support 5 is annular, and the annular support groove 51 may be disposed on the inner wall of the fixed support 5 so that the fixed support 5 is sleeved on the outer side of the rotary member 3.

In an embodiment, the sound box further includes an elastic support member 6 configured to drive the second hook portion 32 to be hooked to the first hook portion 22. In this manner, the housing 1 can be stably stopped in a volume state.

In an embodiment, the elastic support member 6 is disposed around the outer circumference of the slider 2 and the outer circumference of the rotary member 3. In this manner, the internal space of the sound box can be more compact.

In this embodiment, the elastic support member 6 is a spring, an end of which is fixedly connected to the first housing 11 and sleeved on the outer side of the annular limiting step 111.

In other embodiments, elastic support members 6 may be multiple elastic rubber poles, and the multiple elastic support members 6 are evenly distributed around the outer circumference of the slider 2.

In the present disclosure, the steps in which the volume of the sound box is adjusted are described below.

Figure 9:
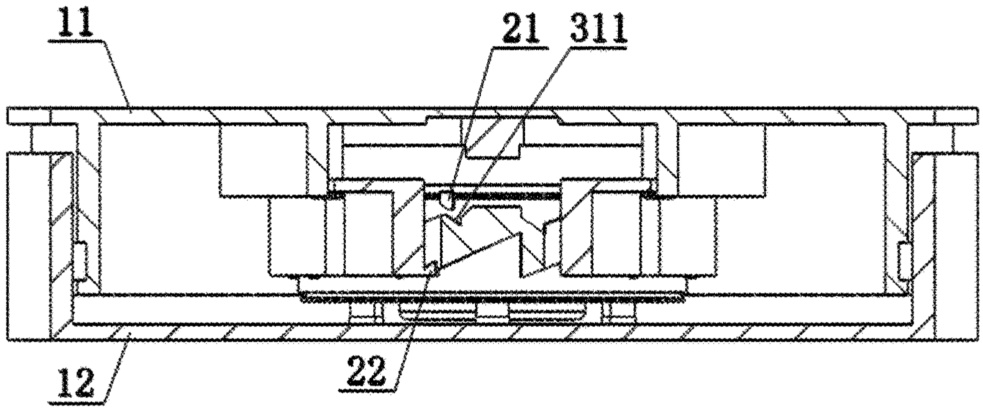
FIG. 9 is sectional view one illustrating the partial structure of a sound box according to an embodiment of the present disclosure.

In step one, as shown in FIG. 9, in an initial state, under the action of the elastic support member 6, the first hook portion 22 is guided and stopped by the first guide surface 321 such that the first hook portion 22 abuts against the first limiting surface 322; the volume of the inner cavity is the first set volume; and the projection of the first abutting portion 21 in the axial direction of the rotary member 3 is located on the first deflection surface 311.

Figure 10:
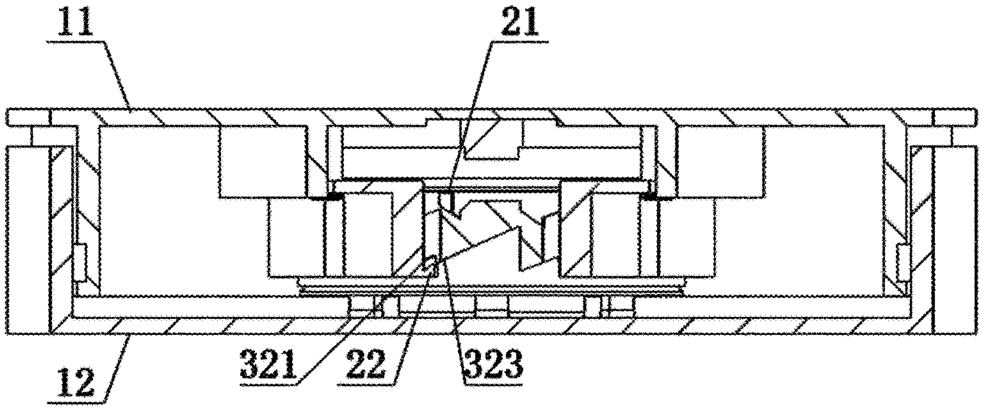
FIG. 10 is sectional view two illustrating the partial structure of a sound box according to an embodiment of the present disclosure.
Figure 11:
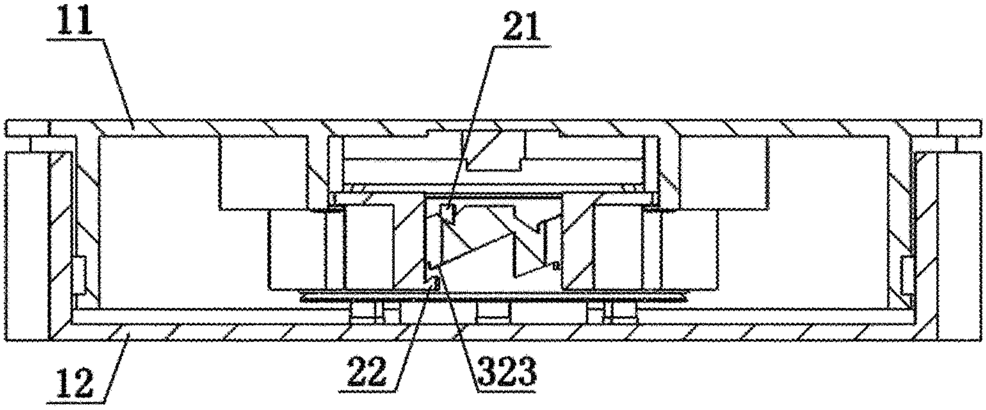
FIG. 11 is sectional view three illustrating the partial structure of a sound box according to an embodiment of the present disclosure.

In step two, as shown in FIG. 10, the housing 1 is pressed, the force in the elastic support member 6 is accumulated, the first housing 11 and the second housing 12 approach each other, and the first abutting portion 21 drives, through the first deflection surface 311, the rotary member 3 to rotate until the first abutting portion 21 is guided and stopped by the first deflection surface 311 such that the first abutting portion 21 abuts against the first stopping surface 312 as shown in FIG. 11. At this time, the projection of the first hook portion 22 in the axial direction of the rotary member 3 is located on the second guide surface 323.

Figure 12:
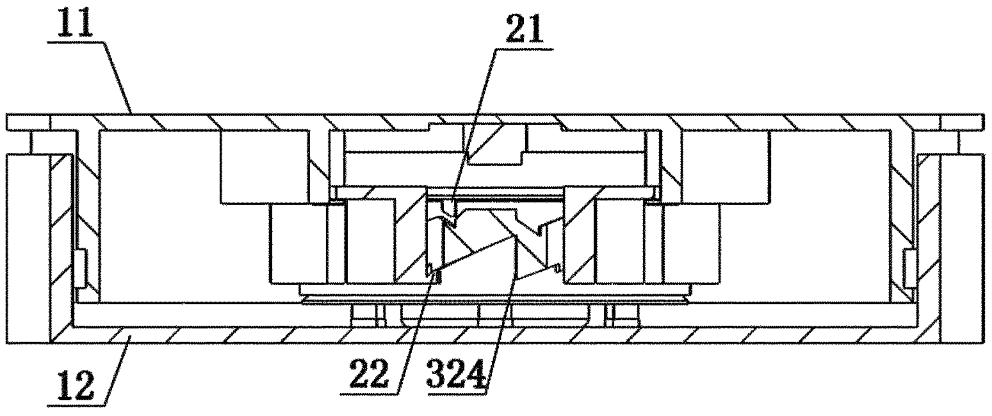
FIG. 12 is sectional view four illustrating the partial structure of a sound box according to an embodiment of the present disclosure.
Figure 13:
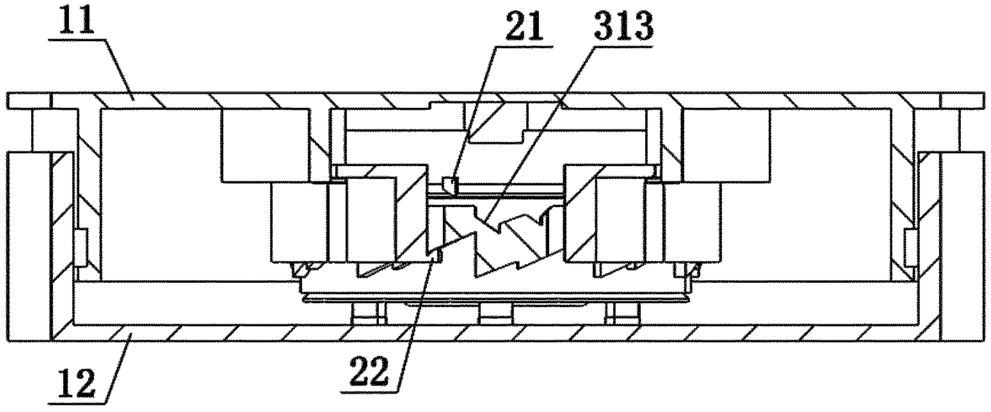
FIG. 13 is sectional view five illustrating the partial structure of a sound box according to an embodiment of the present disclosure.
Figure 14:
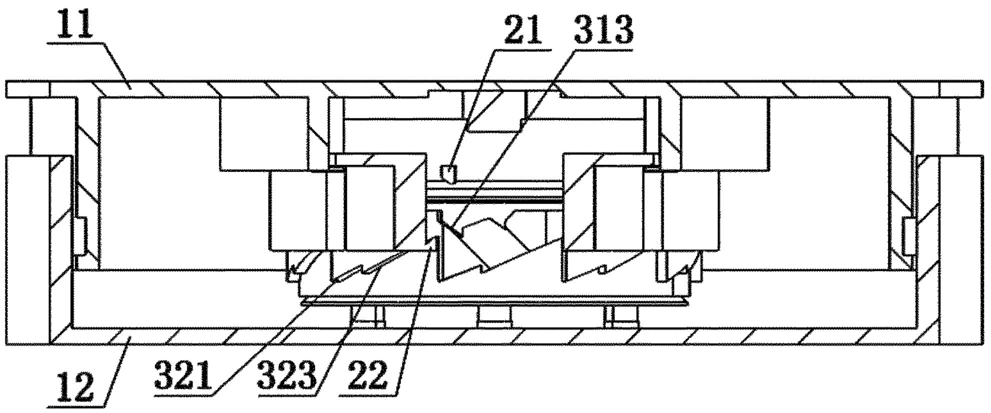
FIG. 14 is sectional view six illustrating the partial structure of a sound box according to an embodiment of the present disclosure.

In step three, as shown in FIGS. 12 and 13, the housing 1 is loosened, the elastic support member 6 drives the first housing 11 and the second housing 12 such that the first housing 11 and the second housing 12 move away from each other, and the first hook portion 22 drives, through the second guide surface 323, the rotary member 3 to rotate until the first hook portion 22 is guided and stopped by the second guide surface 323 such that the first hook portion 22 abuts against the second limiting surface 324 as shown in FIG. 14. At this time, the volume of the inner cavity is the second set volume, and the projection of the first abutting portion 21 in the axial direction of the rotary member 3 is located on the second deflection surface 313.

In step four, the housing 1 is pressed, the force in the elastic support member 6 is accumulated, the first housing 11 and the second housing 12 approach each other, and the first abutting portion 21 drives, through the second deflection surface 313, the rotary member 3 to rotate until the first abutting portion 21 is guided and stopped by the second deflection surface 313 such that the first abutting portion 21 abuts against the second stopping surface 314. At this time, the projection of the first hook portion 22 in the axial direction of the rotary member 3 is located on the first guide surface 321.

In step five, the housing 1 is loosened, the elastic support member 6 drives the first housing 11 and the second housing 12 such that the first housing 11 and the second housing 12 move away from each other, and the first hook portion 22 drives, through the first guide surface 321, the rotary member 3 to rotate until the first hook portion 22 is guided and stopped by the first guide surface 321 such that the first hook portion 22 abuts against the first limiting surface 322. At this time, the volume of the inner cavity is the first set volume.

Apparently, the preceding embodiments of the present disclosure are merely illustrative of the present disclosure and are not intended to limit the examples of the present disclosure. Those of ordinary skill in the art can make changes or variations in other different forms based on the preceding description. All examples cannot be and do not need to be exhausted herein. Any modifications, equivalent substitutions, and improvements made within the spirit and principle of the present disclosure fall within the scope of the claims of the present disclosure.

What is claimed is:

1. A sound box, comprising:

a housing comprising a first housing and a second housing that are slidably connected, wherein an inner cavity is formed between the first housing and the second housing;

a slider fixed to the first housing and provided with a first abutting portion and a first hook portion; and a rotary member mounted on the second housing and rotatable about an axis of the rotary member, wherein the rotary member is provided with a second abutting portion and a second hook portion; when the slider and the rotary member move toward each other, the first abutting portion is capable of abutting against and pushing the second abutting portion to drive the rotary member to rotate; when the slider and the rotary member move in opposite directions, the first hook portion is hooked to the second hook portion; and when the second hook portion is hooked to the first hook portion in different orientations, distances between the slider and the rotary member are different.

2. The sound box of claim 1, wherein the first abutting portion and the first hook portion are both convex heads, a boss is disposed on a sidewall of the rotary member, an end surface at an end of the boss facing the first housing is the second abutting portion, and an end surface at an end of the boss facing away from the first housing is the second hook portion.

3. The sound box of claim 2, wherein a volume of the inner cavity is adjustable between a plurality of set volumes.

4. The sound box of claim 3, wherein the volume of the inner cavity is adjustable between a first set volume and a second set volume, wherein the first set volume is less than the second set volume;

the second abutting portion is provided with a first deflection surface, a first stopping surface, a second deflection surface, and a second stopping surface, wherein the first deflection surface is connected to the first stopping surface, the second deflection surface is connected to the second stopping surface, and the first abutting portion is capable of abutting against the first deflection surface or the second deflection surface to drive the rotary member to rotate;

the second hook portion is provided with a first guide surface, a first limiting surface, a second guide surface, and a second limiting surface, and the first guide surface, the first limiting surface, the second guide surface, and the second limiting surface are connected in sequence, wherein the first hook portion is capable of abutting against the first guide surface or the second guide surface to drive the rotary member to rotate;

when the first hook portion is guided and stopped by the first guide surface such that the first hook portion abuts against the first limiting surface, the volume of the inner cavity is the first set volume, and a projection of the first abutting portion in an axial direction of the rotary member is located on the first deflection surface;

when the first abutting portion is guided and stopped by the first deflection surface such that the first abutting portion abuts against the first stopping surface, a projection of the first hook portion in the axial direction of the rotary member is located on the second guide surface;

when the first hook portion is guided and stopped by the second guide surface such that the first hook portion abuts against the second limiting surface, the volume of the inner cavity is the second set volume, and the projection of the first abutting portion in the axial direction of the rotary member is located on the second deflection surface; and when the first abutting portion is guided and stopped by the second deflection surface such that the first abutting portion abuts against the second stopping surface, the projection of the first hook portion in the axial direction of the rotary member is located on the first guide surface.

5. The sound box of claim 1, further comprising a speaker located in the inner cavity and fixedly connected to the first housing, wherein the slider is disposed around an outer circumference of the speaker.

6. The sound box of claim 5, wherein an annular limiting step is disposed on a side of the first housing facing the second housing, the annular limiting step is provided with a communication hole, the inner cavity communicates with an outside through the communication hole, the speaker covers the communication hole, and the slider is fixedly mounted to the annular limiting step.

7. The sound box of claim 1, further comprising a fixed support located in the inner cavity and fixedly connected to the second housing, wherein the rotary member is rotatably mounted to the fixed support.

8. The sound box of claim 7, wherein an annular support groove is disposed around an outer circumference of the fixed support, and the rotary member is mounted in the annular support groove.

9. The sound box of claim 1, further comprising an elastic support member configured to drive the second hook portion to be hooked to the first hook portion.

10. The sound box of claim 9, wherein the elastic support member is disposed around an outer circumference of the slider and an outer circumference of the rotary member.

* * * * *